United States Patent
Zha

(10) Patent No.: US 7,934,004 B2
(45) Date of Patent: Apr. 26, 2011

(54) SYSTEM AND METHOD FOR MULTI-SERVICE ACCESS

(75) Inventor: Min Zha, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 12/341,529

(22) Filed: Dec. 22, 2008

(65) Prior Publication Data

US 2009/0172174 A1     Jul. 2, 2009

Related U.S. Application Data

(63) Continuation of application No. PCT/CN2007/070244, filed on Jul. 5, 2007.

(30) Foreign Application Priority Data

Jul. 6, 2006   (CN) .......................... 2006 1 0101059

(51) Int. Cl.
*G06F 15/16* (2006.01)
(52) U.S. Cl. ........ 709/228; 709/225; 709/226; 709/227; 709/229; 370/331; 370/351
(58) Field of Classification Search ................... 709/224, 709/225, 226, 227, 228, 229; 370/331, 352, 370/351
See application file for complete search history.

(56) References Cited

U.S. PATENT DOCUMENTS

| | | | |
|---|---|---|---|
| 7,296,078 B2 * | 11/2007 | Sanchez Herrero et al. | . 709/229 |
| 2003/0237004 A1 | 12/2003 | Okamura | |
| 2004/0039820 A1 * | 2/2004 | Colby et al. | ........... 709/226 |
| 2004/0218586 A1 * | 11/2004 | Khoury et al. | ........... 370/352 |
| 2005/0015493 A1 | 1/2005 | Anschutz et al. | |
| 2006/0146752 A1 * | 7/2006 | Jang et al. | ........... 370/331 |

FOREIGN PATENT DOCUMENTS

| | | |
|---|---|---|
| CN | 1377159 A | 10/2002 |
| CN | 101102265 B | 5/2010 |
| EP | 1 357 720 A1 | 10/2003 |

(Continued)

OTHER PUBLICATIONS

State Intellectual Property Office of the People's Republic of China, Examination Report in Chinese Patent Application No. 2006101010595 (Jun. 19, 2009).

(Continued)

*Primary Examiner* — Yves Dalencourt
(74) *Attorney, Agent, or Firm* — Leydig, Voit & Mayer, Ltd.

(57) ABSTRACT

A control and bearer separating system for the multi-service access includes: at least one access node for receiving the message of the user, separating the control flow and the service flow of the message, transmitting the control flow to the controller, and transmitting the service flow to the corresponding edge node, based on the control of the controller; the controller for processing the control flow to control the access node to transmit the service flow to the corresponding edge node, and control the corresponding edge node to process the service flow; and at least one edge node for transmitting the received service flow to the corresponding service provider node, based on the control of the controller. Furthermore, there is a method for connecting the user to the networking using the above control and bearer separating system, and a control and bearer separating method.

15 Claims, 5 Drawing Sheets

FOREIGN PATENT DOCUMENTS

| | | |
|---|---|---|
| WO | WO 00/79742 A1 | 12/2000 |
| WO | WO 2004/014045 A1 | 2/2004 |
| WO | WO 2004/093407 A1 | 10/2004 |

OTHER PUBLICATIONS

European Patent Office, Examination Report in European Patent Application No. 07764172.8 (Oct. 9, 2009).

European Patent Office, Examination Report in European Patent Application No. 07764172.8 (Jun. 14, 2010).

State Intellectual Property Office of the People's Republic of China, English Translation of Written Opinion of the International Searching Authority in International Patent Application No. PCT/CN2007/070244 (Oct. 25, 2007).

IEEE Standards, "Port-Based Network Access Control," IEEE Standards for Local and Metropolitan Area Networks, IEEE Computer Society, Sponsored by the LAN/MAN Standards Committee, IEEE Std. 802.1X™-2004, Revision of IEEE Std. 802.1X-2001 (Dec. 13, 2004).

\* cited by examiner

US 7,934,004 B2

SYSTEM AND METHOD FOR MULTI-SERVICE ACCESS

CROSS-REFERENCE TO RELATED APPLICATIONS

This application is a continuation of International Patent Application No. PCT/CN2007/070244, filed Jul. 5, 2007, which claims priority to Chinese Patent Application No. 200610101059.5, filed Jul. 6, 2006, both of which are hereby incorporated by reference in their entirety.

FIELD OF THE INVENTION

The present invention relates to the field of telecommunications, and, in particular, to a system and an implementation method for multiservice access.

BACKGROUND OF THE INVENTION

Multiservice provisioning has been a development trend of the field. At present, there are two types of architecture which support multiservice, single-edge architecture, and multi-edge architecture.

Support for multiservice scenarios by conventional single-edge and multi-edge techniques will be described hereinafter with reference to FIG. 1 and FIG. 2, respectively.

FIG. 1 illustrates a structural diagram of a conventional, in the case of single-edge, supporting multiservice. As illustrated in FIG. 1, the conventional single-edge technique supports a multiservice scenario.

As can be seen from FIG. 1, an access node (AN) 104 corresponds with a single broadband remote access server (BRAS) 102 to which all service providers, i.e. service providing nodes, are connected. The access server controls user selections of service providing nodes 106 and processes subsequent service flows. Once a new service is added, a corresponding feature support should be added at the access server 102. Authentication of a user 108 and control of selections of service providers 106 are also done at the access server 102.

The single-edge technique illustrated in FIG. 1 has the following disadvantages: because of the variety of service features provided by different service providers, the access server is required to support every service feature, and control flows, such as authentication and accounting, of all users will pass the access server; therefore, the access server is required to support numerous functions, which leads to poor extensibility, and becomes a bottleneck of the whole network.

FIG. 2 illustrates a structural diagram of a conventional, in the case of multi-edge, supporting multiservice. As illustrated in FIG. 2, the conventional multi-edge technique supports a multiservice scenario.

As can be seen from FIG. 2, broadband network gateways (BNGs) 202 are edges of the access network. Selections of service providers, i.e. service providing nodes 206, are done by an AN 204, and related functions such as authentication, authorization, accounting, policy distribution, and Internet Protocol (IP) address allocation are supported by the BNGs 202. The benefit of multi-edge technique is that, different BNGs can be provided to implement different types of services, which makes services easy to be extended.

The multi-edge technique illustrated in FIG. 2 has the drawback that, the BNGs not only forward services, but also perform authentication and control of services. In the case of multi-edge, these control functions are separated among each BNG, so that centralized control of the access network is difficult to achieve. In addition, the AN would be difficult to implement because it is required to have the AN implement the function of network selection.

In a single-edge architecture, a BRAS is the network edge node at which user authentication, authorization, and control are performed collectively. The BRAS has a single connection with an AN, and can perform QoS control of the AN based on a policy. The BRAS also connects multiple service providing nodes, selections of the service providing nodes, and support for various services are all implemented on the BRAS. As the only edge control node, the BRAS is also the only node where various edge services are initiated. Accordingly, the network edge node is the only device in the access network that implements both control and bearing functions; and that the network edge node is required to support a variety of services. Therefore, in the case of single-edge, the functions of the network edge node are complex, difficult to be implemented or extended, and easy to cause single point of failure.

However in a multi-edge architecture, different network edge nodes correspond to and can be optimized for different services. Such a multi-edge architecture is good for extensions of services, and simplifies the implementation of network edge nodes. But new problems of centralized control of users by network edges and selections of network edge nodes by users are raised. Because of the variety of network edges, it would be a problem for the edge nodes to coordinate user control; and that it is required by the architecture for an AN to select network edge nodes, which increases the complexity of the implementation of the AN, meanwhile the implementation of control functions by the edge nodes is not simplified.

SUMMARY OF THE INVENTION

An objective of the present invention is to provide to a system and an implementation method for multiservice access, to solve the above problems which arise with multiservice access.

According to an aspect of the present invention, a system for multiservice access is provided, including: at least one access node, adapted to receive a message of a user, separate control flow and service flow of the message, send the control flow to a controller, and send the service flow to a corresponding edge node based on control by the controller; the controller, adapted to process the control flow, so as to control the access node to send the service flow to the corresponding edge node, and control the corresponding edge node to process the service flow; and at least one edge node, adapted to transmit the received service flow to a corresponding service providing node, based on control by the controller.

An embodiments of the present invention provides a method that implements the above system for a user to access a network, including: receiving, by a service providing node, an authentication request of a user sent by a controller, and authenticating the user; receiving, by the service providing node, an address allocation request of the user sent by the controller/edge node, and allocating an address for the user, if the user passes the authentication; and controlling, by the controller, establishment of a path between an access node and the edge node, for the user.

An embodiment of the present invention further provides a method for separation of control and bearing, including: receiving, by an access node, a message of a user, separating control flow and service flow of the message, sending the control flow to a controller, and sending the service flow to a corresponding edge node, based on control by the controller; processing the control flow, by the controller, to control the access node to send the service flow to the corresponding edge node, and controlling the corresponding edge node to process the service flow; and transmitting, by the edge node, the received service flow to a corresponding service providing node, based on control by the controller.

As can be seen from the above solutions, an embodiment of the present invention provides a system with separation of control and bearing under multi-edge architecture. Multi-edge service bearing and centralized control are combined, so that the system is extensible for various services and centralized user control can be achieved without complicating the implementation of ANs. Particularly, technical benefits brought by embodiments of the present invention include the following:

1. A method for separation of control and bearing is applied in the access network; therefore, the architecture may suit various cases of service access, and network edges may deal with service-related matters only, which is good for extensions of services;

2. User access is controlled collectively by a controller; therefore, the situation where centralized control and management of users cannot be achieved in an access network in the case of multi-edge is avoided, and interactions between edges are reduced; and 3. The complexities of AN devices and network edge devices under multi-edge architecture are simplified, so that selections of networks and establishment of paths are controlled collectively by a controller; ANs may simply separate control flow and bearing flow, and network edge devices can perform processing of corresponding services only.

Other features and advantages of embodiments of the present invention will be described in the description hereinafter, parts of which may become apparent, based on the description, or understood by implementing the embodiments. The advantages of the embodiments of the present invention can be realized or obtained by structures indicated in the description, the claims, and the drawings.

DETAILED DESCRIPTION OF THE EMBODIMENTS

Embodiments of the present invention will be described in details with reference to the drawings.

In order to solve aforementioned problems, an embodiment of the present invention provides a system with separation of control and bearing under multi-edge architecture. In the system, a control device is created to implement control functions, such as authentication, authorization, and policy distribution; multiple edge devices corresponding to different service providing nodes are set up at network edges, the edge devices may perform bearing-related processing only. The idea of separating control and bearing under multi-edge architecture may benefit extensions of services, implement centralized control of user access, and simplify the complexity under multi-edge architecture.

Figure 1:
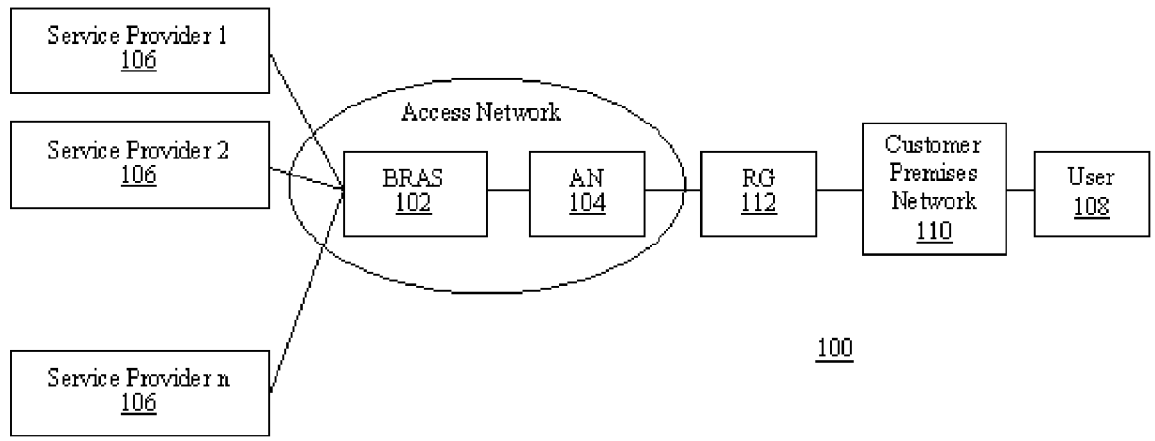
FIG. 1 is a structural diagram, in the case of single-edge, supporting multiservice.
Figure 2:
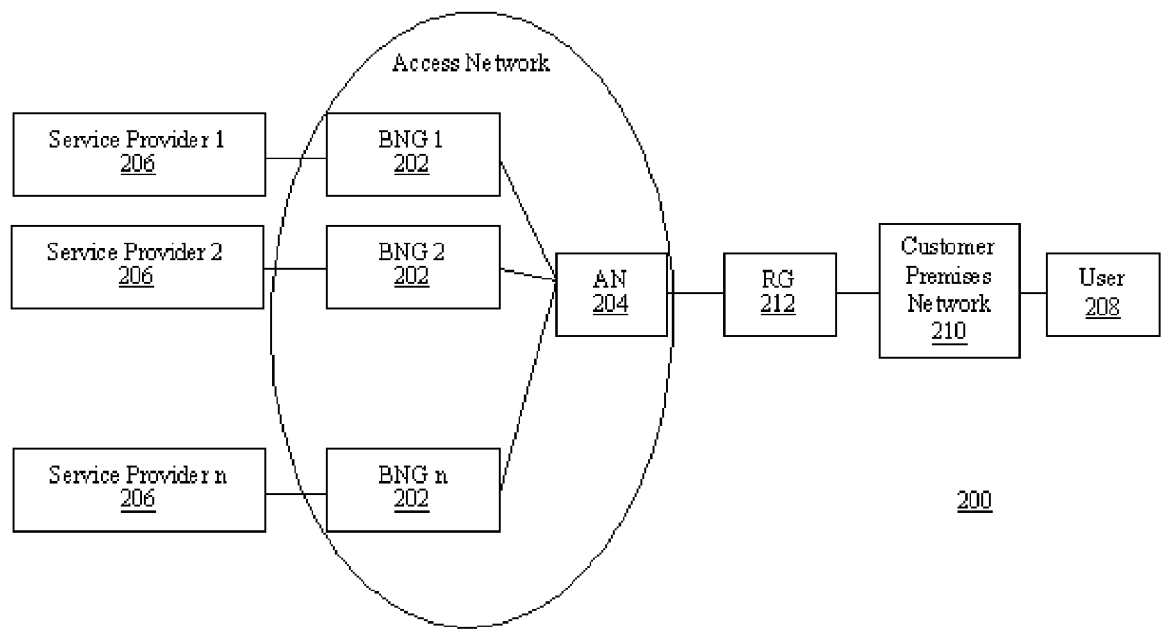
FIG. 2 is a structural diagram, in the case of multi-edge, supporting multiservice.
Figure 3:
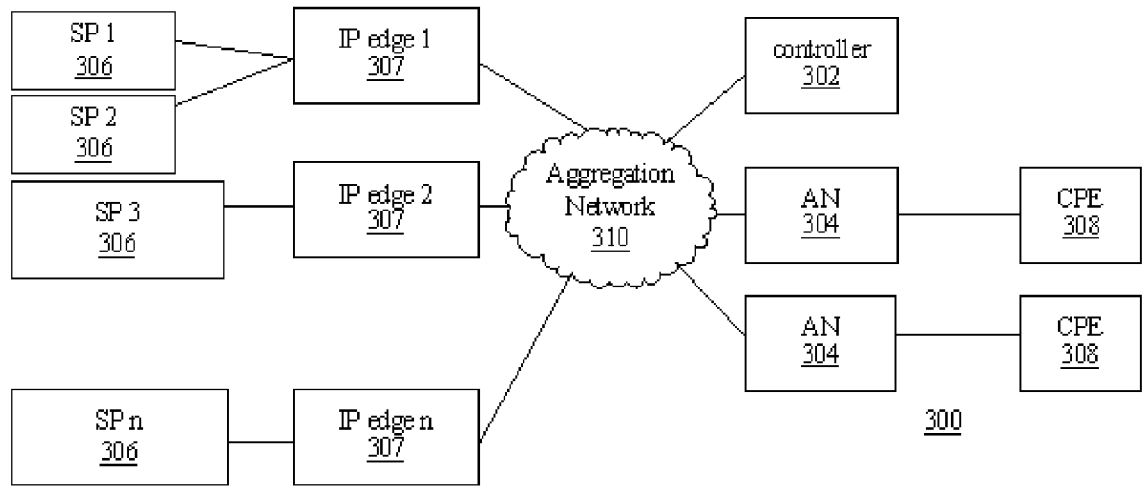
FIG. 3 is a structural diagram of a multi-edge system with separation of control and bearing, according to an embodiment of the present invention.
Figure 6:
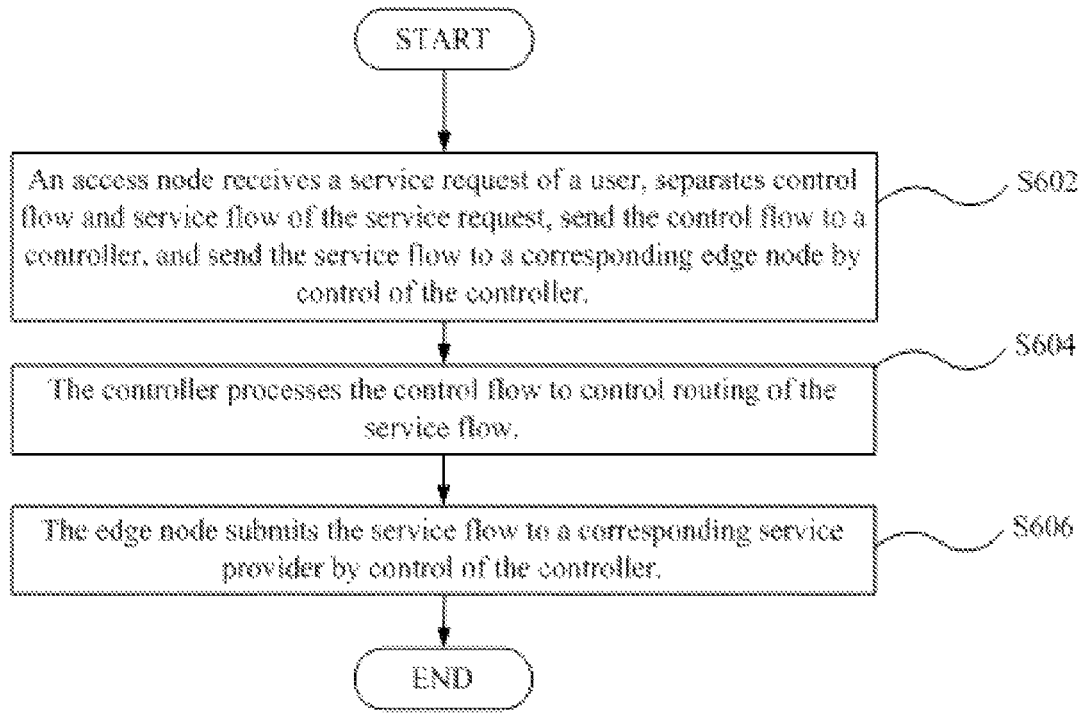
FIG. 6 is a flow chart of a method for separation of control and bearing under multi-edge architecture, according to an embodiment of the present invention.

FIG. 3 is a structural diagram of a multi-edge system with separation of control and bearing, according to an embodiment of the present invention; FIG. 6 is a flow chart of a method for separation of control and bearing under multi-edge architecture, according to an embodiment of the present invention.

A system with separation of control and bearing under multi-edge architecture is provided, according to an embodiment of the present invention, Multi-edge service bearing and centralized control are combined, so that the system is extensible for various services and centralized user control can be achieved without complicating the implementation of ANs. The system for multiservice access with separation of control and bearing 300 as illustrated in FIG. 3 includes: access nodes (AN, also known as access points) 304, adapted to receive a service request of a user, separate control flow and service flow of the service request, send the control flow to a controller 302, and send the service flow to a corresponding edge node 307, based on routing control by the controller 302; the controller 302, adapted to process the control flow, so as to determine routing of the service flow; and edge nodes (i.e. IP edge devices) 307, adapted to submit the service flow to the nodes 306.

Particularly, as shown in FIG. 3, the multi-edge system with separation of control and bearing includes a single device of controller 302, which implements control functions, such as authentication, authorization, and policy distribution; multiple edge nodes, i.e. IP edge devices 307, corresponding to different service providing nodes (SPs) 306, are set up at network edges, the edge nodes 307 may perform bearing-related processing only.

In the architecture, entities of control functions such as AAA (authentication, authorization, and accounting), network edge selection, and policy distribution, are separated from the network edge devices (IP edge devices) 307 and form a single device, i.e. the controller 302; access nodes 304 have the function of separating control flow and service flow, and direct the control flow to the controller; the IP edge devices 307 handle service-related functions only, such as IPTV and VoIP (Voice-over-Internet Protocol).

The service providing nodes 306 perform user authentication, accounting, IP address allocation, and service provisioning. There are fixed control channels between the controller and the IP edge devices via which control flows are transmitted.

The method for multiservice access with separation of control and bearing as illustrated in FIG. 6 includes the following steps:

Step S602: A service request of a user is received by an access node, control flow and service flow of the service request are separated, the control flow is sent to a controller and the service flow is sent to a corresponding edge node, based on control by the controller;

Step S604: The control flow is processed by the controller, so as to control routing of the service flow; and Step S606: The service flow is submitted to a corresponding service providing node by the edge node, based on control by the controller.

Figure 4:
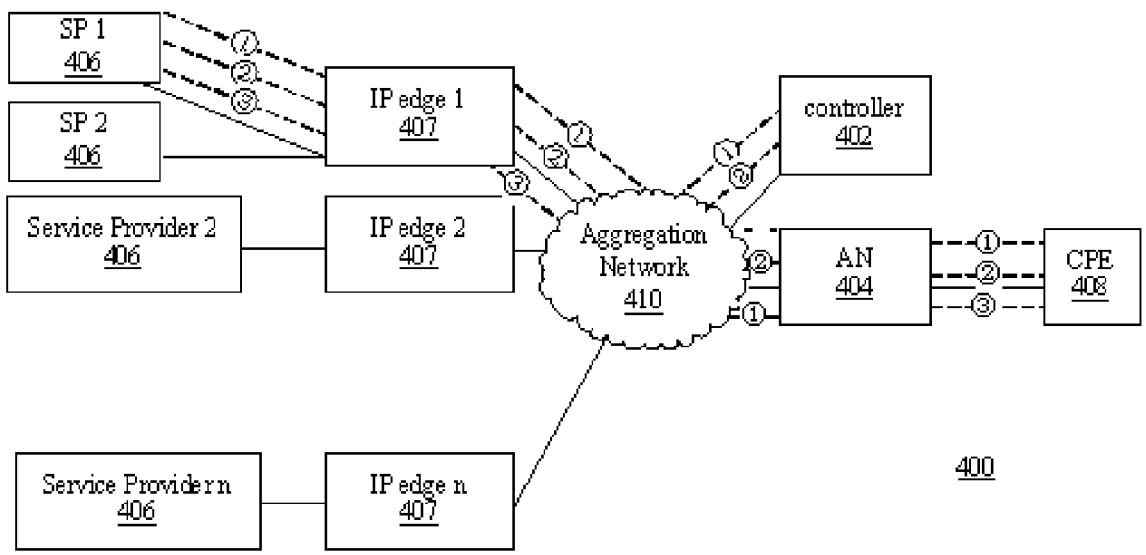
FIG. 4 is a schematic diagram illustrating a process of a user accessing a network, according to an embodiment of the present invention.

FIG. 4 illustrates a process of a user accessing a network, according to an embodiment of the present invention.

As illustrated in FIG. 4, in the above architecture with separation of control and bearing, the process of a user accessing a network, according to an embodiment of the present invention, includes:

1. User authentication process: A user initiates an authentication request, an access node directs the authentication request to a controller, the controller selects a service providing node in the edge for authentication during which address information of a DHCP server is acquired, if the authentication is passed, the controller performs operations which include, but are not limited to:

A. selecting an IP edge device which can reach the network of a corresponding service providing node. In the case of multiple service providing nodes corresponding to the IP edge device, instructing the IP edge device to select an appropriate egress;

B. establishing a path between a physical/logical circuit that the user accesses and the selected IP edge device via the AN; and C. distributing initial QoS parameters or policies to the AN and the IP edge device.

Information that the controller obtains during the user authentication process may include any one or a combination of: address of a DHCP server, QoS parameter, policy of a user accessing a network, IP address of a DNS server, IP address of a WINS (Windows Internet Name Service) server, IP address of a P-CSCF (Proxy-Call Session Control Function) server.

2. User address allocation process: The user initiates a request for address allocation after the authentication is passed; the AN directs the request as a control message to the controller; the controller relays the request message for address allocation to a corresponding SP based on the information obtained during the authentication (e.g. address of a DHCP server), and completes the process of user address allocation.

3. User service forwarding: Subsequent service flows are forwarded, based on the path established between the AN and the IP edge device, after the completion of user authentication and address allocation.

With respect to the process of user address allocation in the above procedure, the AN may forward the message of the address allocation process as service flow directly to the IP edge device, which may function as a relay for user address allocation. Such a procedure of a user accessing a network may suit a scenario where one IP edge device corresponds to one service providing node. The access process is illustrated as FIG. 5.

Figure 5:
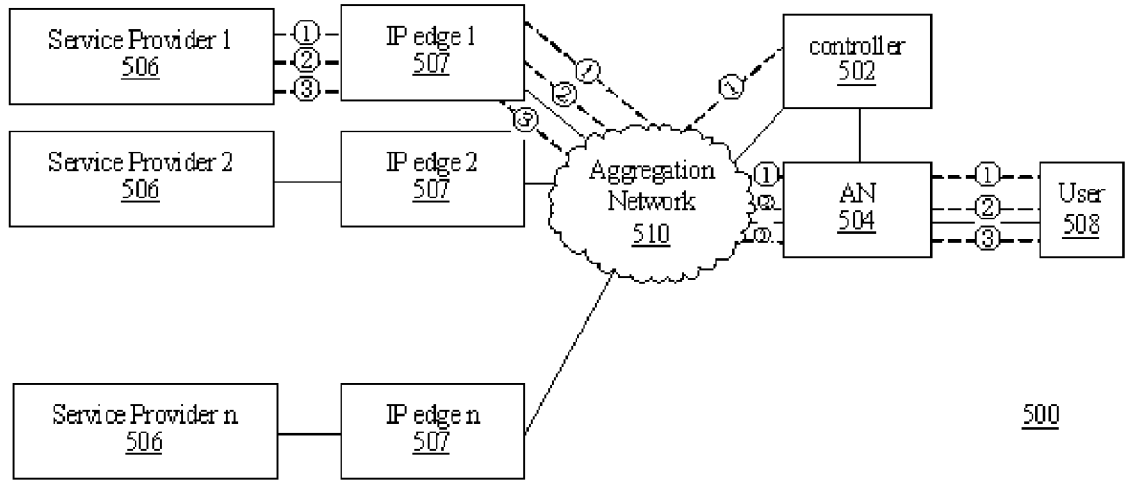
FIG. 5 is a schematic diagram illustrating a process of a user accessing a network, according to an embodiment of the present invention (IP edge is used as a relay for address allocation)

FIG. 5 illustrates a process of a user accessing a network, according to an embodiment of the present invention (IP edge is used as a relay for address allocation).

The process of a user accessing a network according to FIG. 5 differs from FIG. 4 in the user address allocation process.

In the embodiment illustrated by FIG. 5, the process of user address allocation includes: a user initiates a request for address allocation after the user passes authentication, an access node sends the request as a service message to an edge node, the edge node relays the request message for address allocation to a service providing node, corresponding to the edge node.

In the system with separation of control and bearing 400 as illustrated in FIG. 4 and the system with separation of control and bearing 500 as illustrated in FIG. 5, functions implemented by each device are as follows:

The access node 504 at least includes: a flow separation entity, a QoS and policy execution entity, and a path establishment execution entity.

The flow separation entity is adapted to separate control flow and service flow, direct the control flow to the controller 502, and direct the service flow to the IP edge device.

The QoS and policy execution entity is adapted to execute QoS and polices distributed by the controller 502.

The path establishment execution entity is adapted to execute strategies of path establishment by the controller 502.

The controller 502 at least includes any one or a combination of: an AAA controller, a path controller, a policy controller, and an address allocation controller.

The AAA controller is adapted to function as a client or proxy of user authentication, authorization, and accounting; that is, the AAA controller is involved in processing of user authentication, authorization, and accounting.

The path controller is adapted to select an edge node, based on result of user authentication.

The policy controller is adapted to distribute QoS and policies.

The address allocation controller functions as a client or proxy of user address allocation.

The IP edge device 507 at least includes any one or a combination of: a routing entity and a service-related entity.

The routing entity implements a routing function for service flow, i.e. the routing entity routes the service flow received by the IP edge device 507 to a corresponding service providing node, based on control by the controller.

The service-related entity implements service-related functions (e.g. VoIP and multicast). That is, the service-related entity performs service-related operations.

The service providing node 507 at least includes any one or a combination of: an AAA server and an address allocation server (e.g. DHCP server).

Figure 7:
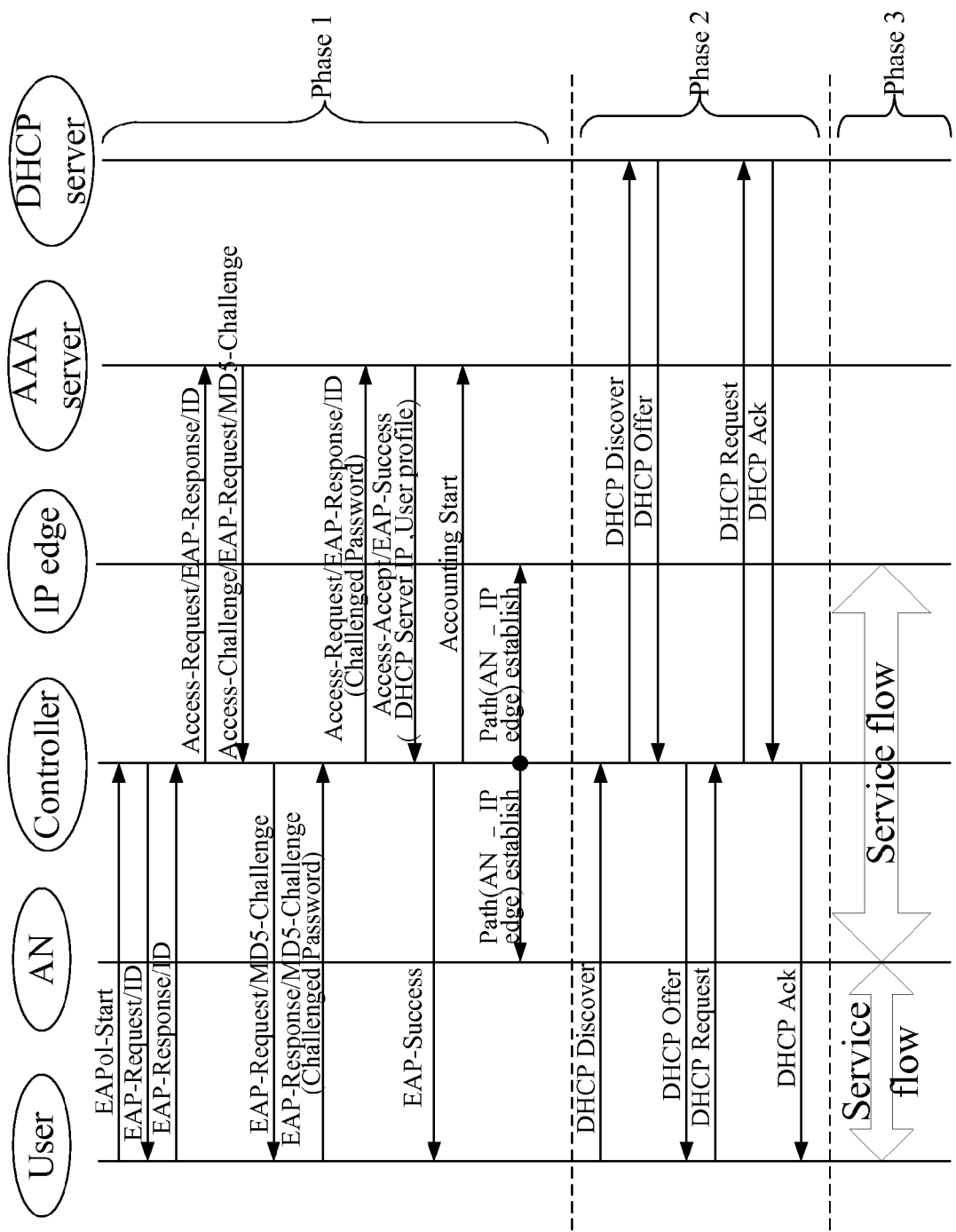
FIG. 7 is a schematic diagram illustrating a process of user access in a multi-edge system under 802.1x, according to an embodiment of the present invention.

FIG. 7 illustrates a process of user access in a multi-edge system under 802.1x, according to an embodiment of the present invention.

According to an embodiment of the present invention, a multi-edge architecture with separation of control and bearing can be implemented by 802.1x and DHCP.

As a method and policy for authenticating a user, 802.1x is a port-based authentication protocol. A port can be either a physical port or a logical port (e.g. VLAN (Virtual Local Area Networks), VCC (Virtual Channel Connection)). The ultimate objective of 802.1x authentication is to determine whether a port is available. With respect to a port, if the authentication is passed, the port will be "opened" and all messages are permitted to pass through; if the authentication is failed, the port will be kept "closed" and only 802.1x authentication protocol messages are permitted to pass through.

Therefore, 802.1x is a protocol with separation of control and bearing; a 802.1x authentication system includes: a supplicant system, an authenticator system, and an AAA server system. In a multi-edge architecture with separation of control and bearing, the 802.1x system can be slightly modified. An AN sends all control messages (e.g., 802.1x and DHCP messages) to a controller, the controller functions as an authenticator and a DHCP relay/proxy, a service provider manages the AAA server and the DHCP server. The AAA protocol can be RADIUS or Diameter. In the case that EAP-MD5 based 802.1x authentication is employed and IP addresses are allocated by DHCP, a whole process of user access can be illustrated as FIG. 7.

The whole process of user access can be divided into three phases:

Phase 1, user AAA process: a user initiates a request for authentication, an AN identifies a 802.1x message and sends the message to a controller, the controller translates between 802.1x and an AAA protocol (e.g. RADIUS or Diameter) as an authenticator, and selects an AAA server of a corresponding service providing node for authentication, based on a user identity in an EAP message of the 802.1x message. The controller obtains information, such as DHCP server address and user profile (including QoS and policies), after the authentication is passed. Based on the information, the controller configures QoS and policies of the AN and the IP edge device accordingly, and establishes a path for service flow between the AN and the IP edge device.

Phase 2, user address allocation process: the user initiates an IP address request, the AN identifies a DHCP message and send the message to the controller, the controller functions as a relay of the user DHCP message or a proxy of a DHCP message of the DHCP server, according to the DHCP server address obtained, after the aforementioned authentication.

At phase 3, a message of service flow accesses the service providing node via the established path between the AN and the IP edge device, after the authentication and the address allocation.

Figure 8:
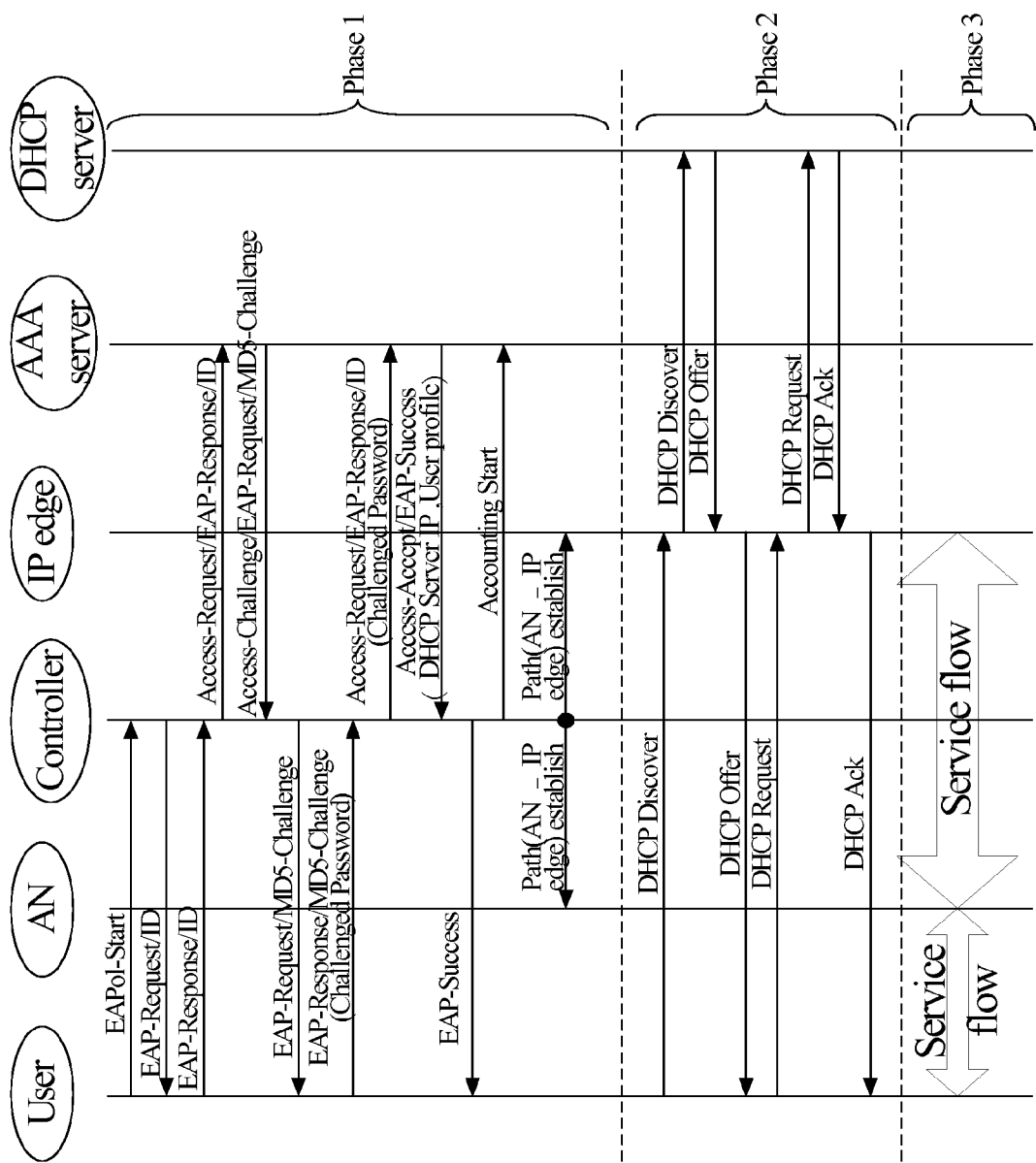
FIG. 8 is a schematic diagram illustrating a process of user access in a multi-edge system under 802.1x, according to another embodiment of the present invention.

FIG. 8 illustrates a process of user access in a multi-edge system under 802.1x, according to another embodiment of the present invention.

According to another embodiment of the present invention, a multi-edge architecture with separation of control and bearing can be implemented by 802.1x and DHCP, of which DHCP relay/proxy function is set up on an IP edge device.

If DHCP relay/proxy function is set up on an IP edge device, an AN may simply forwards 802.1x messages to a controller, and an AAA server is not required to send a DHCP server address to the controller. A detailed procedure can be illustrated as FIG. 8, which will not be further described.

The architecture is suitable for the case that one IP edge device corresponds to one service providing node. Instead of selecting a DHCP server, the IP edge device can be statically configured with a DHCP server address, so that the IP edge device may function as a DHCP relay/proxy.

As can be seen from the above descriptions, an embodiment of the present invention provides a system with separation of control and bearing under multi-edge architecture. Multi-edge service bearing and centralized control are combined, so that the system is extensible for various services and centralized user control can be achieved without complicating the implementation of ANs. Particularly, technical benefits brought by embodiments of the present invention include the following:

1. A method for separation of control and bearing is applied in the access network; therefore, the architecture may suit various cases of service access, and network edges may deal with service-related matters only, which is good for extensions of services;

2. User access is controlled collectively by a controller; therefore, the situation where centralized control and management of users cannot be achieved in an access network in the case of multi-edge is avoided, and interactions between edges are reduced; and 3. The complexities of AN devices and network edge devices under multi-edge architecture are simplified, so that selections of networks and establishment of paths are controlled collectively by a controller, ANs may simply separates control flow and bearing flow, and network edge devices can perform processing of corresponding services only.

It should be understood by those skilled in the art that every module or step in the above embodiments can be implemented with a general-purpose computing apparatus. They can be placed together at a single computing apparatus or distributed in a network of multiple computing apparatuses. Optionally, they can be implemented with executable program code by a computing apparatus, so that they can be stored in a storage apparatus for a computing apparatus to execute; or they can be made into respective integrated circuit modules; or multiple modules or steps of them can be implemented into a single integrated circuit module. Therefore, the present invention is not limited to any specific combination of hardware and software. It should be noted that variations of the embodiments would be apparent for those skilled in the art without departing from the scope of the present invention.

The description above is merely embodiments of the invention, but not intended to limit the present invention. To those skilled in the art, various modifications and variations of the invention can be implemented. Any modification, equivalent alternative, or improvement within the spirit and principle of the invention should be included in the scope of the invention.

What is claimed is:

1. A system for multi-service access, comprising:
    at least one access node, configured to receive a message of a user, separate control flow and service flow of the message, send the control flow to a controller, and send the service flow to a corresponding edge node based on control by the controller;
    the controller, configured to process the control flow, so as to control the access node to send the service flow to the corresponding edge node, and control the corresponding edge node to process the service flow, wherein the controller is a node separated from the access node; and
    at least one edge node, configured to transmit the received service flow to a corresponding service providing node based on control by the controller;
    wherein the service providing node is further configured to:
    receive an authentication request of the user sent by the controller, and authenticate the user;
    receive an address allocation request of the user sent by one of the controller and the edge node, and allocate an address for the user if the user passes the authentication; and
    wherein the controller is further configured to control establishment of a path between the access node and the edge node, for the user.

2. The system according to claim 1, wherein the access node comprises:
    a flow separation entity, configured to separate the control flow and the service flow of the message received by the access node;
    a QoS and policy execution entity, configured to execute QoS and a policy distributed by the controller; and
    a path establishment execution entity, configured to execute a strategy of path establishment between the access node and the edge node distributed by the controller.

3. The system according to claim 1, wherein the controller comprises at least one of:
    an AAA controller, configured to function as a client or proxy of user authentication, authorization and accounting;
    a path controller, configured to select the edge node based on result of user authentication;
    a policy controller, configured to distribute QoS and a policy; and an address allocation controller, configured to function as a client or proxy of user address allocation.

4. The system according to claim 1, wherein the edge node comprises at least one of:
- a routing entity, configured to route the service flow received by the edge node to the corresponding service providing node based on control by the controller; and
- a service-related entity, configured to perform a service-related operation.

5. The system according to claim 1, wherein the service providing node comprises at least one of: an AAA server and an address allocation server.

6. The system according to claim 1, wherein the controller is further configured to:
- select, based on a user identity in an Extensible Authentication Protocol (EAP) message, a service providing node for authentication, the service providing node comprising an authentication, authorization and accounting (AAA) server; and
- obtain, from the AAA server an address of an address allocation server, a Quality of Service (QoS) parameter, and a policy.

7. A method for a user to access a network with a system, comprising:
- receiving, by a service providing node, an authentication request of a user sent by a controller, and authenticating the user;
- receiving, by the service providing node, an address allocation request of the user sent by either of the controller or an edge node, and allocating an address for the user if the user passes the authentication;
- controlling, by the controller, establishment of a path between an access node and the edge node, for the user;
wherein the system comprises:
- at least one access node, configured to receive a message of the user, separate control flow and service flow of the message, send the control flow to the controller, and send the service flow to a corresponding edge node based on control by the controller;
- the controller, configured to process the control flow, so as to control the access node to send the service flow to the corresponding edge node, and control the corresponding edge node to process the service flow, wherein the controller is a node separated from the access node; and
- at least one edge node, configured to transmit the received service flow to the corresponding service providing node based on control by the controller.

8. The method according to claim 7, wherein the authentication of the user comprises:
- sending, by the access node, the authentication request initiated by the user to the controller, and selecting, by the controller, a service providing node corresponding to the corresponding edge node for authentication based on a related identifier or attribute of the user;
the address allocation for the user comprises one of:
- directing, by the access node, the address allocation request initiated by the user to the controller as a control message, and relaying, by the controller, the address allocation request message to a corresponding service providing node; and
- sending, by the access node, the address allocation request initiated by the user to the edge node as a service message, and forwarding, by the edge node, the address allocation request message to a service providing node corresponding to the edge node.

9. The method according to claim 7, wherein information that the controller obtains during the user authentication comprises at least one of: an address of an address allocation server, a QoS parameter, a policy for a user to access a network, an address of a Domain Name Server, an address of a Windows Internet Name Service server, an address of a Proxy-Call Session Control Function server.

10. The method according to claim 7, wherein operations that the controller performs after the authentication is passed comprise at least one of:
- selecting an edge node which can reach a corresponding service providing node, and in the case of one edge node corresponding to multiple service providing nodes, instructing the edge node to select an appropriate service providing node;
- controlling establishment of a path between a physical/logical circuit that the user accesses and the edge node via the access node;
- distributing a QoS parameter and/or a policy to the access node and the edge node;
- performing relaying and proxying of the address allocation request of the user.

11. The method according to claim 7, wherein the system supports 802.1x communication protocol.

12. The method according to claim 11, wherein
- the access node performs a control operation of port closing and opening according to 802.1x communication protocol, the controller performs a processing operation according to 802.1x communication protocol; or
- the access node performs a processing operation according to 802.1x communication protocol; the controller performs a control operation of port closing and opening according to 802.1x communication protocol.

13. A method for separation of control and bearing, comprising:
- receiving, by an access node, a message of a user, separating control flow and service flow of the message, sending the control flow to a controller, and sending the service flow to a corresponding edge node based on control by the controller, wherein the controller is a node separated from the access node;
- processing the control flow, by the controller, to control the access node to send the service flow to the corresponding edge node, and controlling the corresponding edge node to process the service flow; and
- transmitting, by the edge node, the received service flow to a corresponding service providing node based on control by the controller;
- wherein the service providing node receives an authentication request of the user sent by the controller, authenticates the user, receives an address allocation request of the user sent by one of the controller and the edge node, and allocates an address for the user if the user passes the authentication; and
- wherein the controller controls establishment of a path between the access node and the edge node, for the user.

14. The method for separation of control and bearing according to claim 13, further comprising:
- transmitting, by the controller, control flow for user authentication and/or user address allocation, to the edge node, via a fixed control channel between the controller and the edge node; and
- transmitting, by the edge node, the control flow to the service providing node.

15. The method for separation of control and bearing according to claim 13, further comprising:

selecting, by the controller, based on a user identity in an Extensible Authentication Protocol (EAP) message, a service providing node for authentication, wherein the service providing node comprises an authentication, authorization and accounting (AAA) server; and obtaining from the AAA server of the service providing node an address of an address allocation server, a Quality of Service (QoS) parameter, and a policy.

* * * * *